United States Patent [19]

Morita et al.

[11] Patent Number: 5,663,557
[45] Date of Patent: Sep. 2, 1997

[54] MULTIPLE ROTATING ABSOLUTE ENCODER CAPABLE OF ACCURATELY LATCHING ABSOLUTE ADDRESS DATA WITH DATA ON NUMBER OF ROTATIONS

[75] Inventors: Tohru Morita, Yokohama; Kou Ohno, Zama; Motokatsu Imai; Yuuji Yamazaki, both of Yokohama, all of Japan

[73] Assignee: Nikon Corporation, Tokyo, Japan

[21] Appl. No.: 501,651

[22] Filed: Jul. 12, 1995

[30] Foreign Application Priority Data

Jul. 18, 1994 [JP] Japan .................................. 6-187767

[51] Int. Cl.⁶ ................................................ G01D 5/34
[52] U.S. Cl. ........................... 250/231.18; 250/231.14
[58] Field of Search ........................ 250/231.18, 231.14, 250/231.16, 231.17; 324/175, 173; 341/9, 11, 13, 15; 356/375

[56] References Cited

U.S. PATENT DOCUMENTS

| | | | |
|---|---|---|---|
| 3,886,542 | 5/1975 | Ohtsuka | 250/231.18 |
| 4,990,909 | 2/1991 | Ueda et al. | 250/231.18 |
| 5,003,171 | 3/1991 | Paley | 250/231.18 |
| 5,091,643 | 2/1992 | Okutani et al. | 250/231.14 |
| 5,252,825 | 10/1993 | Imai et al. | 250/231.18 |
| 5,332,895 | 7/1994 | Rieder et al. | 250/231.18 |
| 5,406,077 | 4/1995 | Aoki et al. | 250/231.18 |

*Primary Examiner*—Edward P. Westin
*Assistant Examiner*—Kevin Pyo
*Attorney, Agent, or Firm*—Shapiro and Shapiro

[57] ABSTRACT

A disclosed multiple rotating absolute encoder comprises an encoding plate with a first pattern and a second pattern formed thereon, a first detection unit for reading the first pattern and outputting an information in one rotation of the encoding plate, a second detection unit for reading the second pattern and outputting a first rotation information of the encoding plate, a calculation unit for calculating a second rotation data based on the information in one rotation and the first rotation data, a selection unit for monitoring a rotation speed of the encoding plate and selecting either the first rotation data or the second rotation data in accordance with the rotation speed, and a data calculation unit for calculating rotation information of the encoding plate on the basis of either the first rotation data or the second rotation data selected by the selection unit and the information in one rotation.

7 Claims, 3 Drawing Sheets

MULTIPLE ROTATING ABSOLUTE ENCODER CAPABLE OF ACCURATELY LATCHING ABSOLUTE ADDRESS DATA WITH DATA ON NUMBER OF ROTATIONS

BACKGROUND OF THE INVENTION

1. Field of the Invention

The present invention relates to a multiple rotating absolute encoder.

2. Related Background Art

FIG. 4 is a block configuration diagram of a conventional multiple rotating absolute encoder. The illustrated multiple rotating absolute encoder is equipped with an encoding plate provided on the rotation axis, a detection unit 10 for detecting the number of rotations, and a detection unit 13 for detecting an absolute address in one rotation.

On the encoding plate, there are formed a track for detecting the number of rotations of the encoding plate, and a track for detecting the absolute address in one rotation of the encoding plate.

The detection unit 10 for detecting the number of rotations issues an output in order to obtain data Q on the number of rotations from a detection signal which reads the track for detecting the number of rotations.

The detection unit 13 for detecting the absolute address in one rotation issues an output in order to obtain data R on the absolute address in one rotation from a detection signal which reads the track for detecting the absolute address in one rotation.

Further, the multiple rotating absolute encoder is equipped with a data output circuit 16 for receiving the data Q on the number of rotations from the detection unit 10 and the data R on the absolute address in one rotation from the detection unit 13. The data output circuit 16 internally latches the data Q with the data R so as to output an external output signal s corresponding to the absolute position of encoding plate.

This external output signal s contains both data Q and data R.

The detection unit 10 contains a magnetic encoder unit 11 and a counter circuit 12 for counting the number of rotations.

The magnetic encoder unit 11 is constituted by a magnetic pattern which is formed on the encoding plate and serves as the track for detecting the number of rotations mentioned above, and an MR sensor (magnetoresistance sensor) which reads the magnetic pattern and outputs incremental two-phase (the phase A and the phase B) signals l and m.

The counter circuit 12 calculates the data Q from the incremental two-phase signals l and m output from the magnetic encoder unit 11, and outputs said data Q to the data output circuit 16 via a data bus 17.

Note that the detection unit 10 for detecting the number of rotations is arranged to be driven by an external battery or a bulk capacitor inside the encoder (hereinafter simply called the "external battery") even when the main power source is turned off so that it can be operated even when a supply of electric power is stopped.

In order to increase an operation time of the external battery, i.e., a backup time, it is required to decrease the electric power consumed by the detection unit 10. Therefore, a magnetic encoder which consumes a smaller amount of electric power is generally used as a detection unit for detecting the number of rotations for the multiple rotating absolute encoder.

The detection unit 13 for detecting the absolute address in one rotation contains an optical encoder unit 14 and a data conversion circuit 15.

The optical encoder unit 14 reads the track for detecting the absolute address in one rotation of the encoding plate and outputs a data signal (absolute signal) n on the absolute value in one rotation and incremental two-phase (the phase A and the phase B) signals o and p in one rotation.

The data conversion circuit 15 calculates the data R on the absolute address in one rotation based on the data signal n and the incremental two-phase signals o and p in one rotation, output optical encoder unit 14 and outputs said data R to the data output circuit 16 via a data bus 18.

Note that the detection unit 13 for detecting the absolute address in one rotation is arranged to be driven when the main power source is turned on, and to stop its operation when the supply of the electric power is stopped.

In the conventional multiple rotating absolute encoder as mentioned above, it is required to internally latch the data Q with the data R without a time lag in the data output circuit 16. If any time lag is generated, a temporal mismatch arises between the data Q and the data R so that the absolute position of the encoding plate may be detected on the basis of an erroneous number of rotations by plus or minus one rotation, as the case may be.

Such an error in the number of rotations spoils the detection accuracy of the absolute position of the encoding plate and becomes a fatal defect for the multiple rotating absolute encoder.

FIGS. 5 and 6 are views for explaining a time lag between the data Q and the data R.

In FIGS. 5 and 6, the data R obtained in the optical encoder unit is compared with the data Q obtained in the magnetic encoder unit temporally at the time of low-speed rotation and at the time of high-speed rotation, respectively. Note that the data R obtained in the optical encoder unit relates to the number of rotations obtained by using the data on the number of rotations which is detected in the magnetic encoder unit when the supply of the electric power is resumed as an initial value and synthesizing this initial value and the data on the absolute address in one rotation of the optical encoder unit.

As shown in FIG. 5, since a response time of the magnetic encoder unit has no influence at the time of low-speed rotation (this response time indicates a time from a detection of a change in magnetism by the MR sensor to an output of the data on the number of rotations), there arises no time lag between the data on the number of rotations of the magnetic encoder unit and that of the optical encoder unit.

However, as shown in FIG. 6, owing to a delay in the response time of the magnetic encoder unit, areas 50 and 51, which are not temporally matching with the two pieces of data on the number of rotations, are revealed at the time of high-speed rotation. For example, in the area 50, though the data on the number of rotations of the optical encoder unit is n, that of the magnetic encoder unit is n−1. Such time lag of two pieces of data oh the number of rotations indicates that the data on the number of rotations temporally deviates from the data on the absolute address in one rotation in the magnetic encoder unit.

More specifically, since the response time of the optical encoder unit is fast, as compared with that of the magnetic encoder unit, when a rotation of the rotation axis of the absolute encoder, that is, a rotation of the encoding plate, becomes of high speed, a time lag is revealed between the data on the number of rotations and the data on the absolute address in one rotation. In other words, the above-mentioned time lag can not be actually avoided unless the rotation speed of the rotation axis of the absolute encoder is made smaller. As a result, there arises an inconvenience that the rated rotation speed of the absolute encoder is limited by a delay in the response time of the magnetic encoder unit (that is, the phase delay). Reducing a delay in the response time of the magnetic encoder unit in order to avoid the time lag could also be considered. However, in this case, it is required to increase an amount of power to be consumed by the magnetic encoder. As a result, it becomes difficult to ensure a sufficient backup time of the magnetic encoder, and a down-sizing of specifications such as a reduction of the time for securing the data on the number of multiple rotations becomes necessary.

SUMMARY OF THE INVENTION

An object of the present invention is to provide a multiple rotating absolute encoder which can perform an internal latch between data on the number of rotations with data on an absolute address in one rotation without a time lag and ensure a sufficient backup time by reducing an amount of current consumed in the detection unit for detecting the number of rotations.

The above object can be achieved by a multiple rotating absolute encoder which comprises an encoding plate with a first pattern and a second pattern formed thereon, a first detection unit for reading said first pattern and outputting an information in one rotation of said encoding plate, a second detection unit for reading said second pattern and outputting a first rotation data of said encoding plate, a calculation unit for calculating a second rotation data on the basis of said information in one rotation and said first rotation data, a selection unit for monitoring a rotation speed of said encoding plate and selecting either said first rotation data or said second rotation data in accordance with said rotation speed, and a data calculation unit for a calculating rotation information of said encoding plate on the basis of either said first rotation data or said second rotation data selected by said selection unit and said information in one rotation.

The above object can also be achieved by a multiple rotating absolute encoder which comprises an encoding plate with an absolute pattern, an incremental pattern and a pattern for counting the number of rotations, an absolute detection unit for reading said absolute pattern and outputting an absolute signal, an incremental detection unit for reading said incremental pattern and outputting a first incremental signal, a rotation detection unit for reading said pattern for counting the number of rotations, outputting a rotation detection signal indicating the number of rotations of said encoding plate, and detecting a first rotation data of said encoding plate from said rotation detection signal, a conversion unit for converting said absolute signal when receiving a request signal into a second incremental signal, and converting said rotation detection signal into a third incremental signal, a calculation unit for calculating an information in one rotation of said encoding plate on the basis of said first incremental signal and said second incremental signal, and calculating a second rotation data on the basis of said second incremental signal and said third incremental signal, a selection unit for monitoring a rotation speed of said encoding plate and selecting either said first rotation data or said second rotation data in accordance with said rotation speed, and a data output unit for outputting a multiple rotation information of said encoding plate on the basis of either said first rotation data or said second rotation data selected by said selection unit and said information in one rotation.

Further, the above object can be achieved by a multiple rotating absolute encoder which comprises an encoding plate with an optical pattern and a magnetic pattern formed thereon, a first detection unit for reading said optical pattern and outputting a first information of said encoding plate, a second detection unit for reading said magnetic pattern and outputting a second information of said encoding plate, a generation unit for generating a third information on the basis of said first information and said second information, a data calculation unit for calculating a rotation of said encoding plate on the basis of either said second information or said third information and said first information.

Thus, according to the present invention, the absolute position of the encoding plate can be detected with high precision regardless of changes in the rotation speed of the encoding plate even if the electric power to be consumed is reduced to secure sufficient backup time.

Also, an internal latch between the data on the number of rotations and one-rotation information without a time lag and an amount of the electric current to be consumed in the detection unit for counting the number of rotations, thereby ensuring a sufficient backup time.

DESCRIPTION OF THE PREFERRED EMBODIMENTS

An embodiment of the present invention will be described below with reference to the drawings.

Figure 1:
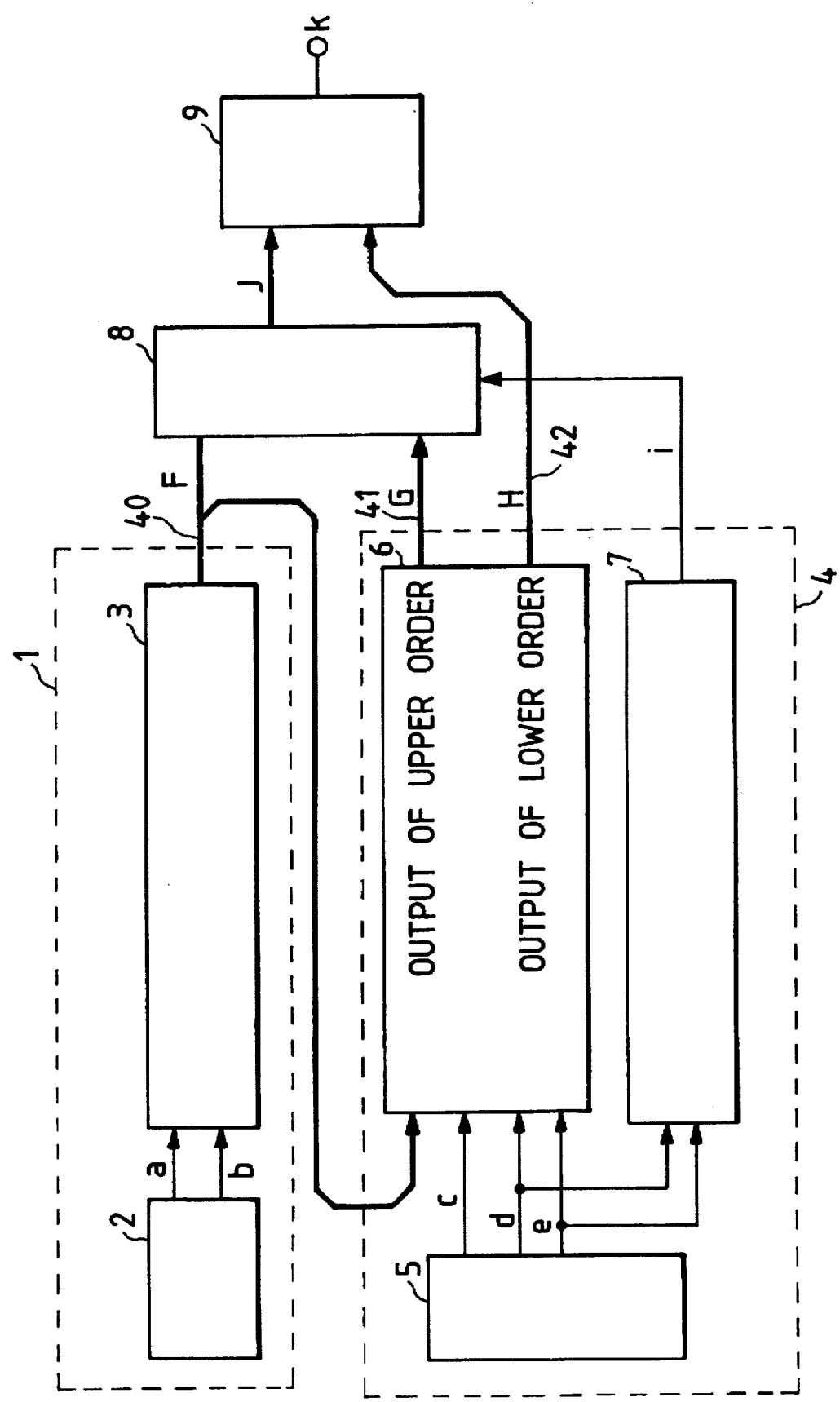
FIG. 1 is a block configuration diagram of a multiple rotating absolute encoder according to an embodiment of the present invention.

FIG. 1 is a block configuration diagram of a multiple rotating absolute encoder according to the embodiment of the present invention.

The multiple rotating absolute encoder is comprised of a detection unit 1 for detecting the number of rotations and a detection unit 4 for detecting an absolute address in one rotation.

The detection unit 1 for detecting the number of rotations is constituted by a magnetic encoder unit 2 and a counter circuit 3 for counting the number of rotations.

The detection unit 4 for detecting the absolute address in one rotation is constituted by an optical encoder unit 5, an up-down counter circuit 6, and a rotation speed monitoring circuit 7.

Figure 2:
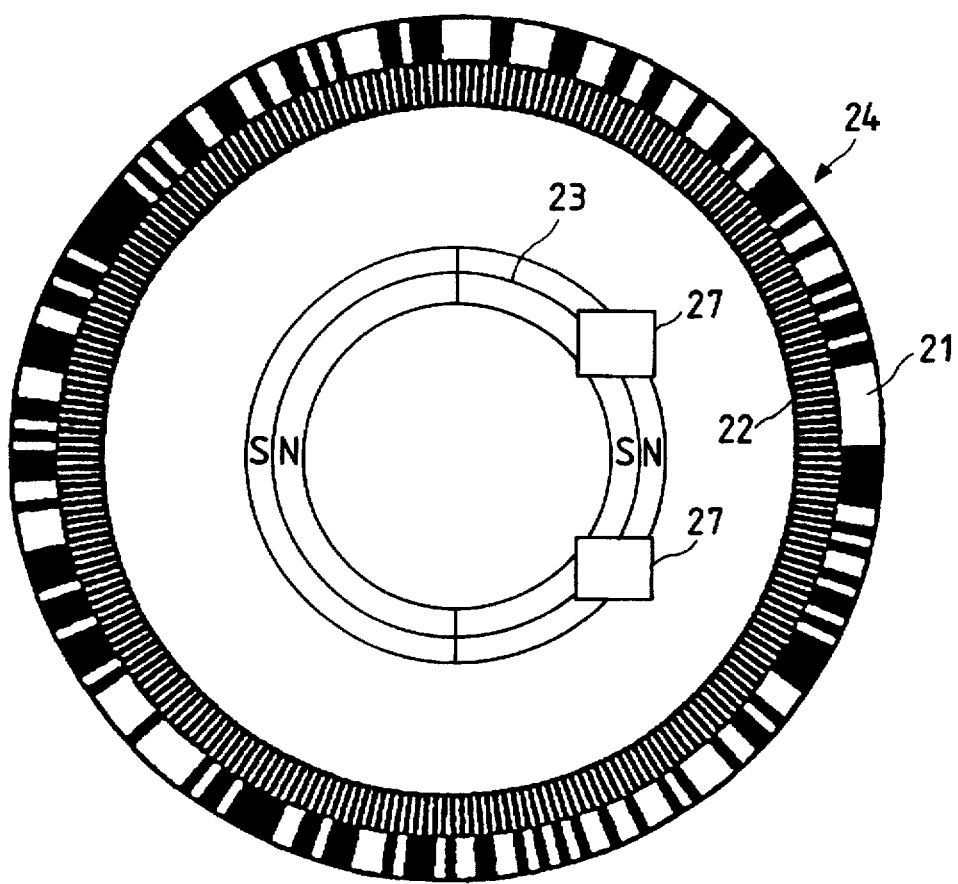
FIG. 2 is a plan view for schematically showing specific configurations of a magnetic encoder unit and an optical encoder unit in the multiple rotating absolute encoder of FIG. 1.
Figure 3:
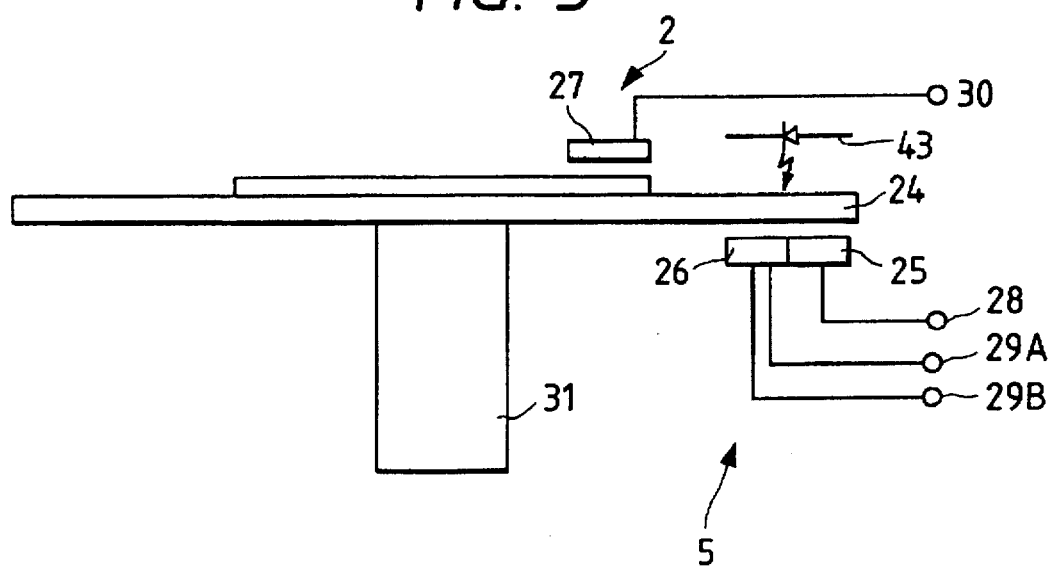
FIG. 3 is a lateral view for schematically showing the specific configurations of the magnetic encoder unit and the optical encoder unit in the multiple rotating absolute encoder of FIG. 1.
Figure 4:
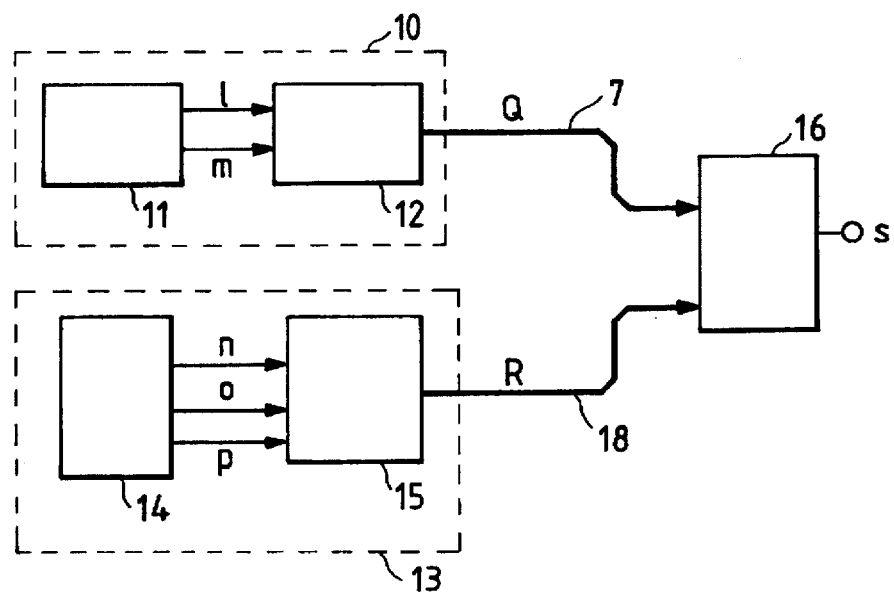
FIG. 4 is a block configuration diagram of a conventional multiple rotating absolute encoder.
Figure 5:
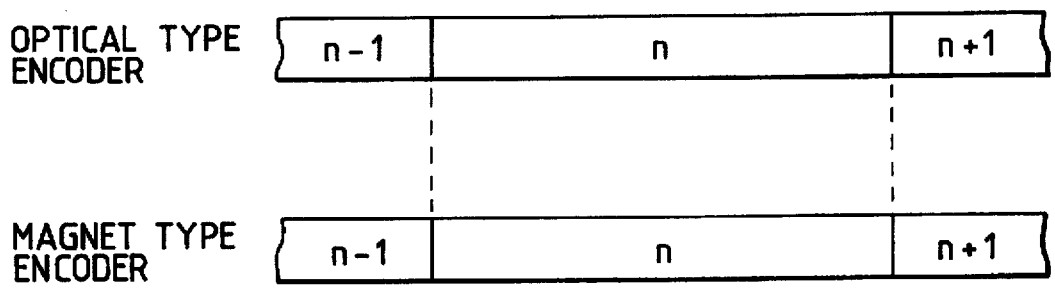
FIGS. 5 and 6 are views for respectively explaining a time lag between data on the number of multiple rotations and data on an absolute address in one rotation in the conventional multiple rotating absolute encoder.
Figure 6:
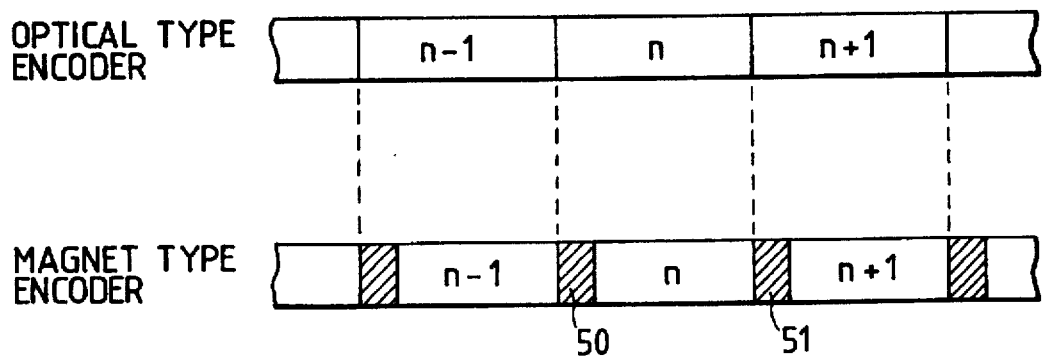

The magnetic encoder unit (magnetic type detection unit) 2 and the optical encoder unit (optical type detection unit) 5 will be described with reference to FIGS. 2 and 3. FIGS. 2 and 3 are a plan view and a lateral view, respectively, for schematically showing specific configurations of the magnetic encoder unit 2 and the optical encoder unit 5 in the multiple rotating absolute encoder shown in FIG. 1.

On an encoding plate 24 fixed to a rotation axis 31, first track 21 with an absolute pattern (M-series pattern) of one track formed thereon, a second track 22 with an incremental pattern formed thereon, and a third track 23 with a magnetic pattern formed thereon are respectively formed concentrically.

The first and second tracks 21 and 22 have a white and black pattern of an optical type, and the third track 23 has an SN pattern of a magnetic type.

A light source 43 is arranged on one side of the plane of the encoding plate 24, and an absolute detection unit 25 and an incremental detection unit 26 are arranged on the other side.

More specifically, the light source 43 and the absolute detection unit 25 are arranged with the first track 21 therebetween, and the light source 43 and the incremental detection unit 26 are arranged with the second track 22 therebetween.

Also, an MR sensor (magnetoresistance element) 27 is arranged to face the third track 23.

The encoding plate 24 and each of the detection units (the absolute detection unit 25, the incremental detection unit 26, and the MR sensor 27) move relative to each other. In the present embodiment, the encoding plate 24 moves with respect to each of the detection units.

The magnetic encoder unit 2 is constituted by the third track 23 and the MR sensor 27 which moves along the third track 23 for detecting a change in the magnetism of the magnetic pattern.

This MR sensor 27 generates one pulse when the encoding plate 24 makes one rotation. A signal which is output from the MR sensor 27 becomes incremental two-phase (the phase A and the phase B) signals a and b.

The optical encoder unit 5 is constituted by the first track 21, the absolute detection unit 25 which moves along the first track 21 for reading the absolute pattern, the second track 22, and the incremental detection unit 26 which moves along the second track 22 for reading the incremental pattern.

The absolute detection unit 25 reads the absolute pattern when the encoding plate 24 makes a rotation so as to output a data signal on an absolute value in one rotation (absolute signal) c.

The incremental detection unit 26 reads the incremental pattern when the encoding plate 24 makes a rotation so as to output incremental two-phase signals d and e in one rotation.

The incremental two-phase signals a and b output from the MR sensor 27 are output to the counter circuit 3 for counting the number of rotations via a terminal 30. Also, the data c on the absolute value in one rotation output from the absolute detection unit 25 is output to the up-down counter circuit 6 via a terminal 28. Further, the incremental two-phase signals d and e in one rotation which are output from the incremental detection unit 26 are output to the up-down counter circuit 6 and the rotation speed monitoring circuit 7 via terminals 29A and 29B.

Next, description will be made on a block configuration diagram of the multiple rotating encoder according to the embodiment of the present invention with reference to FIG. 1.

The multiple rotation detection unit 1 will be described below.

As stated before, in the magnetic encoder unit 2, the MR sensor 27, which reads the magnetic pattern formed on the third track 23 of the encoding plate 24, outputs the incremental two-phase signals a and b to the counter circuit 3 for counting the number of rotations.

The counter circuit 3 calculates first rotation data F on the number of rotations based on the incremental two-phase signals a and b, and outputs the first rotation data F to a data selector 8 and the up-down counter circuit 6 via a data bus 40.

Note that the detection unit 1 for counting the number of rotations constitutes a detection unit for outputting a first rotation data of the encoding plate 24, and is arranged to be driven by the external battery even when the main power source of an external controller is turned off so that it can operate even when the supply of the electric power is stopped.

Next, the detection unit 4 for detecting the absolute address in one rotation will be described.

As stated before, in the optical encoder unit 25, the absolute detection unit 25 which reads the absolute pattern outputs the data signal c on the absolute value in one rotation to the up-down counter circuit 6, and the incremental detection unit 26 which reads the incremental pattern outputs incremental two-phase signals d and e in one rotation to the up-down counter circuit 6 and the rotation speed monitoring circuit 7.

The up-down counter circuit 6 calculates the data (or information) H on an absolute address in one rotation based on the data signal c on the absolute value in one rotation and the incremental two-phase signals d and e in one rotation, and outputs the data H from outputs of lower order to a data output circuit 9 via a data bus 42.

Further, the up-down counter circuit 6 calculates the said rotation data G on the number of rotations from the incremental two-phase signals d and e in one rotation output from the optical encoder unit 5, and outputs the said rotation data G from outputs of upper order to a data selector 8 via a data bus 41.

The rotation speed monitoring circuit 7 is constituted by, for example, a logic circuit, and detects a rotation speed of the rotation axis 31 of the absolute encoder, that is, a rotation speed of the encoding plate 24, on the basis of the incremental two-phase signals d and e output from the optical encoder unit 5. In other words, the rotation speed monitoring circuit 7 determines the rotation speed of the rotation axis 31 from a change in the periodic interval from one rise edge to the next rise edge of the incremental signal d and a change in the periodic interval from one ending edge to the next ending edge of the incremental signal e.

The rotation speed monitoring circuit 7 sends a rotation speed monitor signal i to the data selector 8.

Note that the detecting unit 4 for detection the absolute address in one rotation constitutes a detection unit for outputting information in one rotation of the encoding plate 24, and is arranged to be driven by the main power source of the external controller, and to stop its operation when the supply of electric power is stopped.

The data selector 8 selects either the first rotation data F on the number of rotations from the detection unit 1 for detecting the number of rotations or the second rotation data G on the number of rotations from the detection unit 4 for detecting the absolute address in one rotation on the basis of the rotation speed monitor signal i from the rotation speed monitoring circuit 7 so as to output the selected data to a data output circuit 9. For example, the data selector 8 selects the first rotation data F when the rotation speed of the rotation axis 31 is not more than 4,500 rpm, and selects the second rotation data G when the rotation speed exceeds 4,500 rpm.

Then, the data output circuit 9 outputs an external output signal k corresponding to the absolute address of the encoding plate on the basis of the data F or G which is selected by the data selector 8 (in the drawing, the selected data F or G is output as rotation data J) and the data H on the absolute address in one rotation. The external output signal k is output serially.

An operation of the multiple rotating absolute encoder of the present embodiment which is arranged as mentioned above is described below.

When the main source is turned on and the supply of the electric power is resumed, a lower digit of the up-down counter circuit 6 is loaded with the data signal c on the absolute value in one rotation which is output from the optical encoder unit 5, and an upper digit of said circuit 6 is loaded with the first rotation data F on the number of rotations from the detection unit 1 for detecting the number of rotations. This first rotation data F indicates the number of rotations of the encoding plate when the main source is turned off.

After that, upon reception of the incremental two-phase signals d and e in one rotation output from the optical encoder unit 5, an up-down counting operation is performed from the lowest significant bit (LSB). If a carry or a borrow occurs in the counting operation, a change of plus or minus one influences the upper digit.

The data H on the absolute address in one rotation from the optical encoder unit is output from outputs of lower order of the up-down counter circuit 6. Also, from outputs of upper order, the second rotation data G on the number of rotations, which is updated by the incremental two-phase signals d and e detected by the optical encoder unit 5, is output by using the first rotation data F on the number of rotations output from the detection unit 1 for counting the number of rotations as an initial value.

Thus, the second rotation data G uses the data F (output from the magnetic encoder unit 2) as the initial value, then is updated by the incremental two-phase signal of the optical magnetic encoder unit 5. Therefore, no substantial time lag is generated between the data H, which is an output of low order of the up-down counter circuit 6, and the data G, which is an output of upper order, regardless of a change in the rotation speed of the encoding plate.

The data selector 8 selects data on the number of rotations in accordance with the rotation speed of the rotation axis of the absolute encoder detected by the rotation speed monitoring circuit 7. That is, the selector 8 selects the first rotation data F when the rotation speed is low, and the second rotation data G when the rotation speed is high. As already stated, there is no substantial time lag between the first rotation data F detected by the magnetic encoder unit 2 and the data H detected by the optical encoder unit 5 when the rotation speed is low. There is also no substantial time lag between the second rotation data G detected by the optical encoder unit 5 and the data H detected by the optical encoder unit 5 when the rotation speed is high.

Thus, the data output circuit 9 internally latches the data F or G which is properly selected by the data selector 8 with the data H in a state where there is no substantial time lag so as to send the external output signal k corresponding to the absolute position of the encoding plate.

In the foregoing embodiment, the data on the number of rotations is selected in accordance with the rotation speed of the rotation axis of the absolute encoder. However, whether the rotation speed is low or high, or whether the rotation state of the rotation axis is changed or not, it is possible to internally latch the second rotation data G with the data H all the time. However, when the first rotation data F is selected from the magnetic encoder unit when the rotation speed is low, the reliability of the data can be obtained. That is, for data on the number of rotations of the multiple rotating absolute encoder, the first rotation data F from the magnetic encoder unit 2 which can detect data on the number of rotations even when the supply of the power is stopped, serves as reference data.

The present invention is described above by using the absolute encoder which is equipped with the magnetic encoder unit and the optical encoder unit. However, it is clear that the present invention can also be applied to an absolute encoder which comprises two detection units having different response times.

Further, in the foregoing embodiment, the rotation speed of the encoding plate is detected by the rotation speed monitoring circuit 7 on the basis of an incremental signal of the optical encoder unit. However, the rotation speed of the rotation axis may be detected on the basis of an incremental signal of the magnetic encoder unit, or by other suitable methods.

Thus, in the foregoing embodiment, it is possible to perform the internal latch between the data on the number of rotations with the data on the absolute address in one rotation with no time lag, and to secure a sufficient backup time by reducing an amount of current to be consumed in the detection unit for detecting the number of rotations.

Therefore, the backup time can be sufficiently secured by reducing the consumed amount of the electric power in the magnetic encoder unit, and the absolute position of the encoding plate can be detected with high accuracy regardless of a change of the rotation speed of the encoding plate.

Note that though the optical encoder unit in the present embodiment is arranged to have the incremental pattern, it may be arranged only by an absolute pattern. In this case, the second rotation data G on the absolute address in one rotation may be calculated from a data signal on the absolute value in one rotation which is output by reading the absolute pattern.

In the present embodiment, the first rotation data, which is generated on the basis of the incremental signal of the rotation detection unit for detecting the data on the number of rotations (i.e., the rotation data) of the encoding plate such as a magnetic encoder unit of the backup system, is used as the initial value so as to generate the second rotation data which is updated on the basis of the incremental signal of, for example, the optical encoder unit (the detection unit of the optical type) constituted by the absolute detection unit and the incremental detection unit.

Then, rotation data is selected in accordance with the rotation speed of the encoding plate, that is, when the rotation speed is low, the first rotation data is selected, and when the rotation speed is high, the second rotation data is selected to be output to the data output means.

As described, when the rotation speed of the encoding plate is high, the absolute position of the encoding plate can be detected with high accuracy on the basis of the second rotation data and the information in one rotation which are precisely matched temporally with each other.

On the other hand, when the rotation speed of the encoding plate is low, as described above, a substantial so-called time lag does not occur between the first rotation data of the magnetic encoder unit and the information in one rotation of the optical encoder unit (absolute address data in one rotation). Therefore, when the rotation speed is low, the absolute position of the encoding plate can be detected by using the first rotation data of the magnetic encoder unit which is an original rotation detection unit of the encoding plate and is operated even when the supply of the electric power is stopped.

What is claimed is:

1. A multiple rotating absolute encoder comprising:

an encoding plate with a first pattern and a second pattern formed thereon;

a first detection unit for reading said first pattern and outputting information regarding one rotation of said encoding plate;

a second detection unit for reading said second pattern and outputting first rotation data regarding a quantity of rotations of said encoding plate;

a calculation unit for calculating second rotation data regarding a quantity of rotations of said encoding plate, based on said information regarding one rotation and said first rotation data;

a selection unit for monitoring a rotation speed of said encoding plate and selecting either said first rotation data or said second rotation data in accordance with said rotation speed; and a data calculation unit for calculating rotation information of said encoding plate based on the rotation data selected by said selection unit and said information regarding one rotation.

2. A multiple rotating absolute encoder comprising:

an encoding plate with an absolute pattern, an incremental pattern and a pattern for counting the number of rotations;

an absolute detection unit for reading said absolute pattern and outputting an absolute signal;

an incremental detection unit for reading said incremental pattern and outputting an incremental signal;

a rotation detection unit for reading said pattern for counting the number of rotations, outputting a rotation detection signal indicating the number of rotations of said encoding plate, and determining first rotation data of said encoding plate based on said rotation detection signal;

a calculation unit for calculating information regarding one rotation of said encoding plate based on said absolute signal and said incremental signal, and calculating second rotation data based on said absolute signal, said incremental signal, and said first rotation data;

a selection unit for monitoring a rotation speed of said encoding plate, and selecting either said first rotation data or said second rotation data in accordance with said rotation speed; and a data output unit for outputting rotation information of said encoding plate based on the rotation data selected by said selection unit and said information regarding one rotation.

3. A multiple rotating absolute encoder according to claim 2, wherein said selection unit comprises:

a rotation speed monitoring circuit for detecting a rotation speed of said encoding plate so as to output a rotation speed signal corresponding to the detected rotation speed; and a data selector for selecting either said first rotation data or said second rotation data in accordance with said rotation speed signal so as to output the selected rotation data to said data output unit.

4. A multiple rotating absolute encoder according to claim 3, wherein said rotation speed monitoring circuit detects the rotation speed of said encoding plate based on said incremental signal detected by said incremental detection unit.

5. A multiple rotating absolute encoder according to claim 3, wherein:

said rotation speed signal is a signal for indicating whether the rotation speed of said encoding plate is high or low; and said data selector selects said second rotation data when the rotation speed of said encoding plate is high and selects said first rotation data when the rotation speed of said encoding plate is low.

6. A multiple rotating absolute encoder according to claim 2, wherein said calculation unit comprises an up-down counter circuit, loads said absolute signal into a lower digit portion of said up-down counter circuit and loads said first rotation data into an upper digit portion of said up-down counter circuit when receiving a request signal, performs an up-down counting operation from a least significant bit of said up-down counter circuit based on said incremental signal, outputs said second rotation data from an output of upper order of said up-down counter circuit, and outputs said information regarding one rotation of said encoding plate from an output of lower order of said up-down counter circuit.

7. A multiple rotating absolute encoder comprising:

an encoding plate with an optical pattern and a magnetic pattern formed thereon;

a first detection unit for reading said optical pattern and outputting first information regarding said encoding plate;

a second detection unit for reading said magnetic pattern and outputting second information regarding said encoding plate;

a generation unit for generating third information based on said first information and said second information; and a data calculation unit for calculating rotation information of said encoding plate based on said first information and either said second information or said third information.

* * * * *